United States Patent [19]

Hines

[11] 4,244,594

[45] Jan. 13, 1981

[54] CREEPER BRAKE DEVICE

[76] Inventor: Ivan C. Hines, 2706 46th Ave., Rock Island, Ill. 61201

[21] Appl. No.: 63,610

[22] Filed: Aug. 3, 1979

[51] Int. Cl.[3] .................................... B62B 11/00

[52] U.S. Cl. .................................... 280/32.6; 188/5; 280/87.04 A

[58] Field of Search .............. 280/32.6, 11.2, 87.04 A, 280/43.24; 188/5, 6, 8

[56] References Cited

U.S. PATENT DOCUMENTS

| | | | |
|---|---|---|---|
| 1,446,945 | 2/1923 | Sunderland | 280/32.6 |
| 1,831,408 | 11/1931 | Cremer | 280/32.6 |
| 1,890,755 | 12/1932 | Shepherd | 280/87.04 A |
| 2,246,628 | 6/1941 | Heckman | 280/32.6 |
| 2,611,417 | 9/1952 | Henry et al. | 280/32.6 |
| 3,361,437 | 1/1968 | Loftis | 280/32.6 |
| 4,043,566 | 8/1977 | Johnson | 280/87.04 A |
| 4,168,076 | 9/1979 | Johnson | 280/11.2 |

FOREIGN PATENT DOCUMENTS

| | | | |
|---|---|---|---|
| 154419 | 5/1956 | Sweden | 280/32.6 |

*Primary Examiner*—Randolph A. Reese
*Assistant Examiner*—Donn McGiehan
*Attorney, Agent, or Firm*—Henderson & Sturm

[57] ABSTRACT

This invention relates to braking devices employed with creepers. Provision of a brake which eliminates or greatly reduces undesirable head, arm and hand, and other body movements required to actuate braking is achieved by this invention. A brake control flap (23) is attached to or formed at the rear of the creeper floor (12, 13). A brake (21) with resilient strip (26) is attached to the underside of the flap (23). Weight placement causes the flap (23) to bend from a straight conformation level with the floor (13) into a downwardly arcuate conformation disposing the resilient strip (26) against the ground.

3 Claims, 4 Drawing Figures

FIG. 1
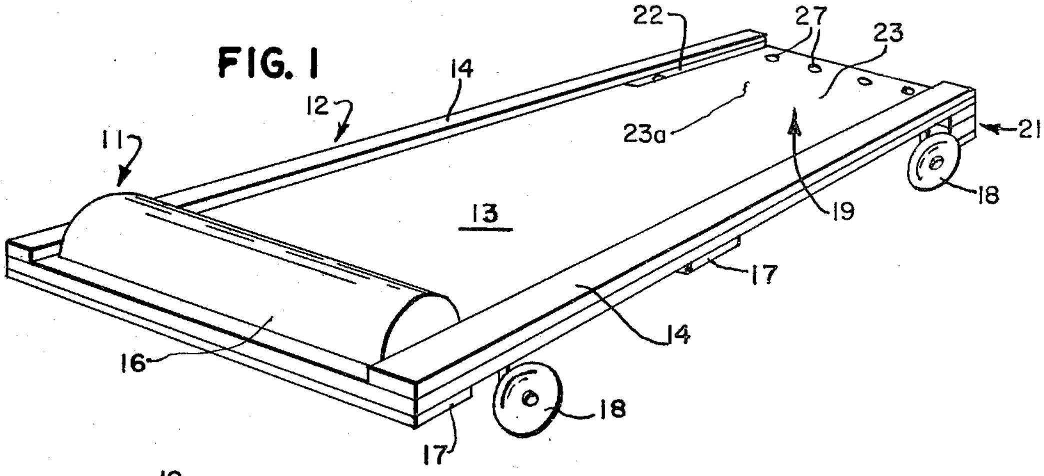
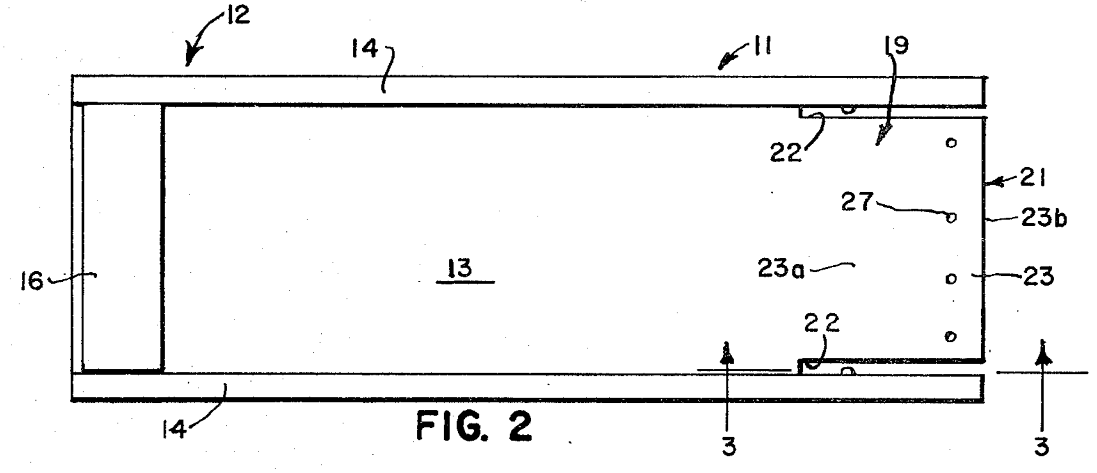
FIG. 2
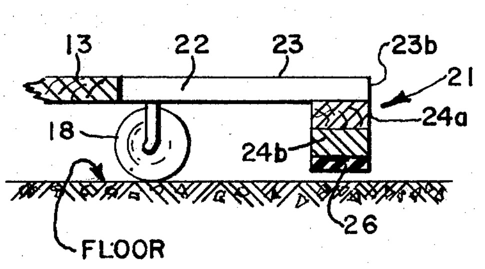
FIG. 3
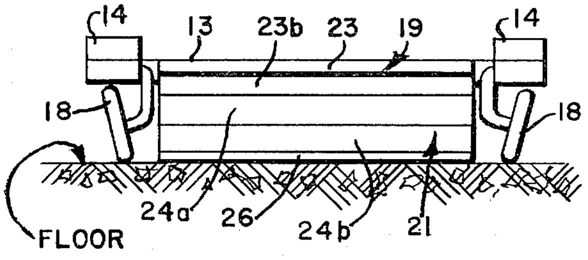
FIG. 4

CREEPER BRAKE DEVICE

TECHNICAL FIELD AND BACKGROUND ART

The invention relates to devices which are designed for supporting mechanics in a supine position a small distance above the ground or floor while working on automobiles or the like. Such devices are generally called creepers. The invention more particularly relates to braking devices employed on creepers.

Creepers have been in existence for some time. The problem of controlling and braking the movement of a creeper is a continuing one. Many creepers have no braking structures, and the braking is performed by the mechanic using his arms and legs. Braking devices have been developed. However, these are generally actuated by manually operated levers. A braking device has been developed which is actuated by movement of a headrest, and one has been developed which is actuated by rolling the creeper about a longitudinal axis. In each case, the mechanic must turn his attention from his repair task, removing his hands generally from the work and/or subjecting his body to large movements and uncomfortable positions, while securing the creeper against movement.

DISCLOSURE OF THE INVENTION

The creeper brake device of this invention includes a brake control flap formed at the rear of the creeper. Bars having a rubber strip depend from the rearmost edge of the flap. When the mechanic rests his weight toward the rear of the flap, the bars with rubber strip engage the ground to brake the creeper. When the mechanic shifts his weight toward the front of the flap, the bars with rubber strip disengage, and the creeper may then roll.

It is an object of this invention to provide a brake device for creepers which is more efficient to operate.

Another object of this invention is to provide a brake device for creepers which eliminates or greatly minimizes undesirable body movement, such as large head movements or rolling of the torso, in order to secure creepers against movement.

Still another object is to maximize the time a mechanic may concentrate his sight, and keep his hands, upon the work and to greatly reduce or eliminate the need to employ the hands to brake a creeper.

Yet another object is the provision of a brake structure for creepers whereby a minimum of body movement is required to actuate the brake and the mechanic is in a relatively comfortable position at all times.

Also an object is the provision of an inexpensive, readily maintainable brake structure for creepers capable of attaining the aforementioned objects.

These objects and other features and advantages of this invention of a creeper brake device will become readily apparent upon referring to the following description, taken in conjunction with the appended drawings.

BRIEF DESCRIPTION OF THE DRAWING

The creeper brake device invention is illustrated in the drawing wherein:

FIG. 1 is a perspective view of a creeper employing the brake of this invention;

FIG. 2 is a top plan view showing the creeper brake device;

FIG. 3 is an enlarged, fragmentary vertical sectional view taken along line 3—3 of FIG. 2; and FIG. 4 is an enlarged, rear elevational view showing operation of the creeper brake device.

BEST MODE FOR CARRYING OUT THE INVENTION

The creeper brake device of this invention is shown generally at 11 employed in a creeper 12. The creeper 12 includes a generally rectangular floor member 13. Attached to the top side of the floor 13, along the longitudinal edges thereof, are elongated side strip members 14. Also attached to the top side of the floor 13, and adjacent the front end thereof, is a head rest pad 16. Several transverse or cross bar supports 17 are spaced apart and attached to the underside of the floor 13. Four caster or wheel structures 18 also are attached to the underside of the floor 13.

The brake device 11 more particularly includes a brake control 19 and a brake 21. The brake control 19 includes a pair of parallel longitudinal cuts or slots 22 formed into the floor 13, each slot 22 being disposed adjacent a side strip member 14. A flap structure 23 is formed having a forward end *23a* joined to the floor 13 and having a free, transverse rear end surface *23b*.

The brake 21 includes an upper elongated, generally rectangular strip *24a* which is attached to the underside of the flap 23. The strip *24a* extends between the slots 22 and is disposed adjacent rear end surface *23b*. A lower strip *24b*, of generally the same dimensions as the upper strip *24a*, is attached to the underside of strip *24a*. The strip *24b* extends between the vertical planes which pass through the slots 22 and abuts the plane defined by the rear end surface *23b*. An elongated resilient strip 26, generally rectangular in configuration, is attached to, and covers, the downwardly facing surface of strip *24b*. A plurality of carriage bolts 27 pass through the flap 23 and strips *24a*, *24b*, 26 to hold the brake 21 together and connect the brake 21 to the brake control 19. Suitable glues or cement known to the art are employed also to join the resilient 26 to the strip *24b* and may be employed to join strips *24a*, *24b* and the flap 23.

Creepers 12 are generally constructed of wood although a suitable metal such as steel or aluminum may be employed. The wheel structures 18 generally are made of metal and/or rubber or a hard plastic. The strip 26 is preferably rubber or a resilient plastic. In a creeper 12 of a standard size, the slots 22 would be about eight inches (about twenty centimeters) in length. The flap 23 and strips *24a*, *24b*, 26 would have a combined vertical dimension of about $2\frac{3}{4}$ inches (about seven centimeters), and the strip 26 would be disposed about $\frac{1}{4}$ inch (about six millimeters) above the ground.

When the creeper 12 with brake device 11 is employed, the mechanic assumes the standard back-down supine position on the creeper 12. The mechanic places his weight upon the creeper 12 forward of the forward end *23a*. The creeper 12 is then freely movable, as the brake device 11 is not engaging the floor. When the creeper 12 is positioned, the mechanic shifts his weight onto the flap 23 between the slots 22. The flap 23 bends, the rear end *23b* and strips *24a*, *24b*, 26 moving toward the ground. The resilient strip 26 is thereby brought into engagement with the ground and causes braking of the creeper 12.

During the aforementioned movement and braking of a creeper 12 with brake device 11, the hip region of the mechanic may remain disposed over the brake control 19. When the mechanic is working, or resting, at a particular location, the buttocks are pressed against the flap 23, thereby causing braking of the creeper 12. When the creeper is moved, the mechanic generally employs his legs; and, usually, the hip area will be somewhat elevated, and the shoulder and back area will bear more weight. The flap 23 will tend to straighten out, and the strip 26 will disengage from the floor, thereby permitting movement. Where for whatever reason the buttocks of the mechanic press against the flap 23, with enough force to cause braking even when movement is attempted, the mechanic shifts his position slightly forward on the creeper 12 such that his buttocks rest in front of the forward end 23*a*.

The strips 24*a*, 24*b* may be a single piece. A plurality of standard sized strips 24*a*, 24*b* is shown, as different creepers 12 have different distances between the underside of the floor 13 and the ground surface, and adaptation of the brake device 11 to creepers 12 is facilitated by variability of the number of standard strips 24 employed.

INDUSTRIAL APPLICABILITY

It can be seen that body movement of a mechanic required to control braking of a creeper 12 is greatly reduced by employment of the braking device 11. The mechanic's hands and arms are generally not required to actuate the device 11 and may therefore remain on the work or grasping a tool. Head movement of the mechanic is independent of braking movements, and the mechanic therefore may more readily concentrate on the workpiece or other surroundings as required. Body movement is reduced to that which is natural to propel the creeper 12 or at most to minor forward and rearward shifting of weight. The creeper 12 tends to remain braked until the mechanic positively acts to move the creeper 12. Should the mechanic have the occasion to work in an upright sitting position, the creeper 12 will remain braked by the mechanic sitting on the flap 23. A mechanic working on an automobile or some other workpiece may more effectively perform his job because control of the creeper 12 is effected with an economy of movement. Furthermore, as the mechanic may brake the creeper 12 by initially placing weight on the flap 23 and then positioning himself on the creeper 12, or by keeping weight on the flap 23 while moving himself into a sitting, then squatting position, both getting onto and off of the creeper 12 is made easier and safer.

Although a preferred embodiment has been disclosed herein, it is to be remembered that various modifications and alternate constructions can be made thereto without departing from the full scope of the invention as defined in the appended claims.

I claim:

1. A caster-supported creeper having an elongated rectangular floor including opposite end edges and opposite side edges and attached elongated side strips running lengthwise of the side edges, longitudinally spaced apart transverse supports attached to the floor, and a headrest carried by the floor at a portion thereof adjacent to one end edge, characterized in that the floor is continuous throughout its length and includes as a major part of its length a relatively rigid body-supporting portion to which the side strips and transverse supports are affixed, the floor further includes as an extension and attached to said body-supporting portion a downwardly deflectable part having a free terminal end at the end edge of the floor opposite to the headrest end edge, and said deflectable part is free from support by the strips and supports so as to be bendable downwardly by the weight of the user, and a ground-engaging brake is secured to said deflectable part.

2. The creeper of claim 1 and further wherein a slot is cut into the floor at the end edge opposite the headrest and adjacent each side strip and extending toward the headrest end edge, the deflectable part being formed between said slots.

3. A creeper as defined in claim 2 and further wherein said ground-engaging brake includes a plurality of strip members, a first strip member being attached to the free terminal end, at least one other strip member being attached to said first strip member, and ground-engageable resilient means depending from said other strip member.

* * * * *